United States Patent [19]

Ko

[11] Patent Number: 5,713,414
[45] Date of Patent: Feb. 3, 1998

[54] DEFROSTING PLATE

[76] Inventor: Li-Sheng Ko, 3F., No. 245, Jao-Ho St., Taipei City, Taiwan

[21] Appl. No.: 721,029

[22] Filed: Sep. 26, 1996

[51] Int. Cl.$^6$ .................................................. F28F 7/00
[52] U.S. Cl. .......................... 165/185; 99/483; 99/646 R
[58] Field of Search ................................ 126/369, 21 R, 126/19 R; 62/531; 165/185; 99/415, 418, 422, 450, 483, 646 R, 484

[56] References Cited

U.S. PATENT DOCUMENTS

| | | | |
|---|---|---|---|
| 2,507,862 | 5/1950 | Mead | 165/185 |
| 4,527,538 | 7/1985 | Caferro | 126/39 J |
| 4,793,324 | 12/1988 | Caferro | 126/369 |
| 5,349,899 | 9/1994 | Tominaga et al. | 99/646 R |
| 5,368,093 | 11/1994 | Takehashi | 99/483 |

Primary Examiner—James C. Yeung
Attorney, Agent, or Firm—Morton J. Rosenberg; David I. Klein

[57] ABSTRACT

An improved defrosting plate includes a defrosting mesh plate and a tray. The defrosting mesh plate is made from aluminum laminae processed into a plate with a plurality of polygonal meshes, appearing like a honeycomb. The meshes effectively enlarge the heat exchange surface and, working in cooperation with the aluminum laminae of good heat conductivity, speed up defrosting. The meshes also promote air circulation to allow hot air reach the food on the defrosting mesh plate from all directions to prevent dead spots. The water drops formed during defrosting may also flow through the meshes into the tray below.

1 Claim, 3 Drawing Sheets

DEFROSTING PLATE

BACKGROUND OF THE INVENTION (a) Field of the Invention

The present invention relates to an improved defrosting plate with meshes.

(b) Description of the Prior Art

A conventional defrosting plate 3 is shown in FIG. 4. It comprises a defrosting surface 31 having heat-absorbing capability and made of metal alloy. A plurality of elongated water guide grooves 32 are formed on the defrosting surface 31. The four sides of the defrosting surface 31 each forms a downwardly slanting water guide angle 33. The defrosting plate 3 is fitted in a tray 4 for collecting water dripped from the defrosting plate 3 during defrosting. Such a conventional defrosting plate 3 has the following disadvantages:

(1) The defrosting plate must be provided with a defrosting surface of a considerable thickness, and as mentioned above, the defrosting surface is made of metal alloy, which is costly. Besides, it takes a complex process to plate the defrosting plate with the defrosting surface.

(2) In order to guide water dripped from the defrosting plate into the tray below, it is necessary to form guide grooves and guide angles, which is rather troublesome.

(3) Most importantly, the heat exchange in conventional defrosting plates takes place between the defrosting plate and that part of the food in direct contact with the defrosting, and heat exchange for other parts of the food is conducted via air, thus forming a heat exchange cycle. The contact surface with such a manner of heat exchange is restricted to the surface area of the defrosting plate, which is very narrow indeed and cannot permit large-area heat exchange; the defrosting rate is consequently low too.

(4) Since the surface of the defrosting plate is not provided with any means for guiding air flow to facilitate heat exchange, there will be many dead spots, so that the defrosting is not complete.

SUMMARY OF THE INVENTION

Accordingly, a primary object of the present invention is to provide an improved defrosting plate in which the defrosting plate is provided with meshes to improve on the conventional planar defrosting plates and is further provided with an aluminum laminate in place of the costly metal alloy defrosting surface so as to reduce costs, facilitate processing and eliminate use of guide grooves or guide angles. The arrangement of the meshes provides, in addition to a heat exchange surface between the food and the plate, permits circulation of air through the mesh holes to achieve large-area heat exchange and hence speed up the defrosting rate. The better circulation of air also eliminates any dead spots, so that defrosting may be complete and thorough.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
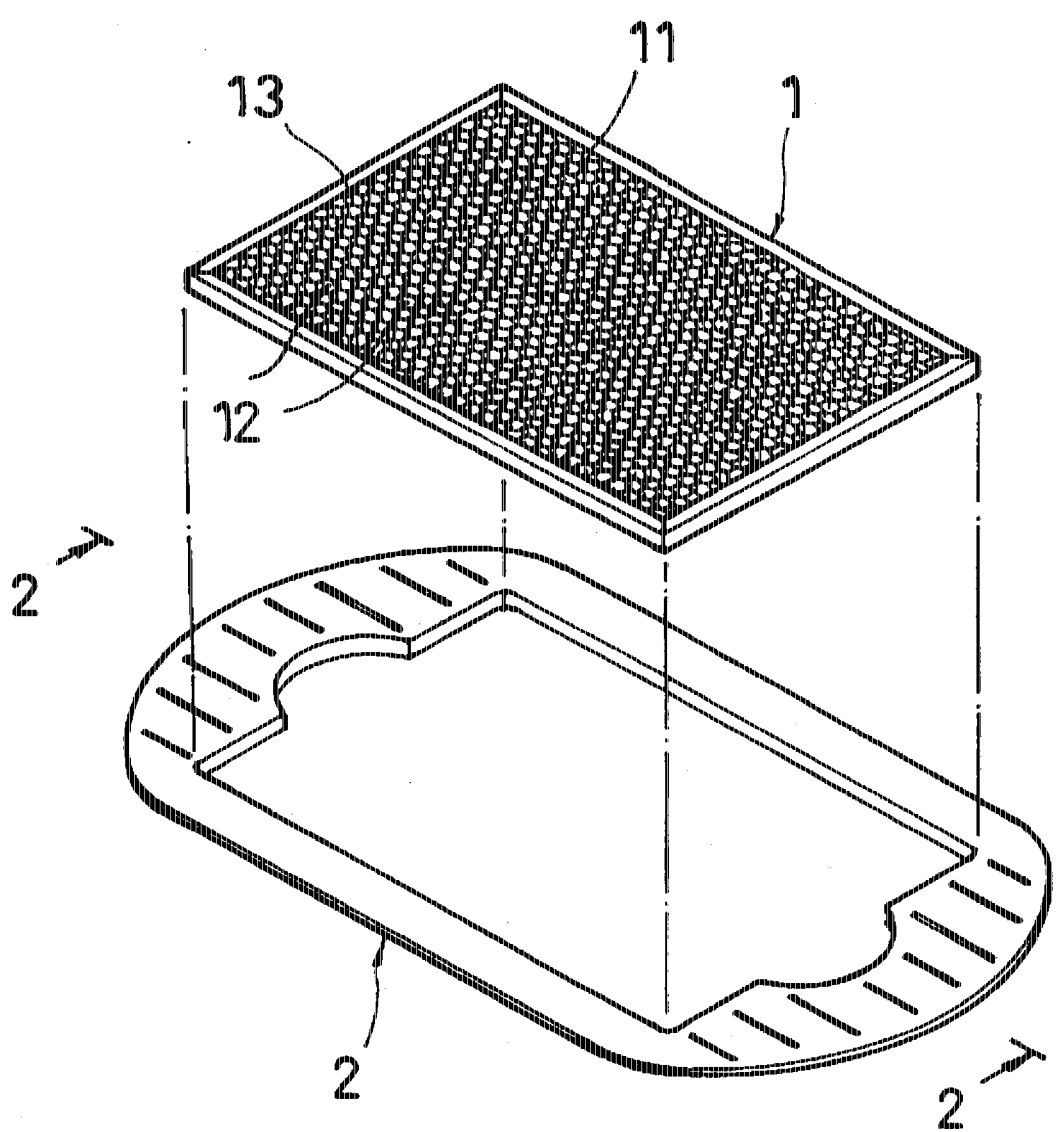
FIG. 1 is an elevational, exploded view of the present invention.
Figure 1A:
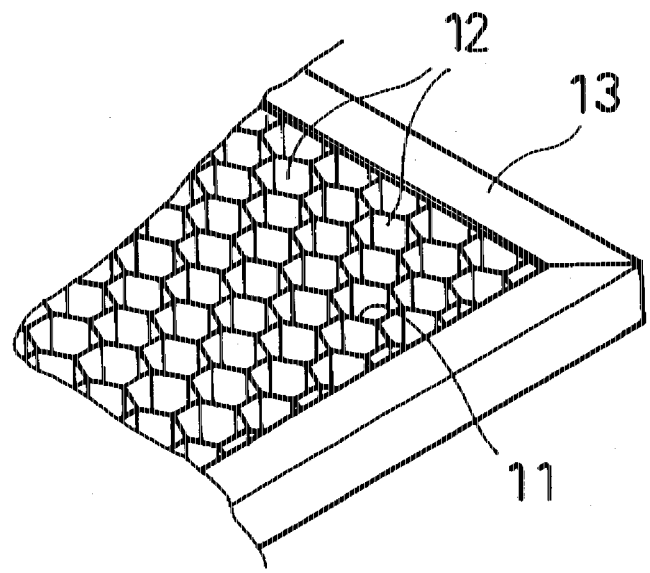
FIG. 1A is an enlarged, elevational view of a mesh plate of the invention in part.
Figure 2:
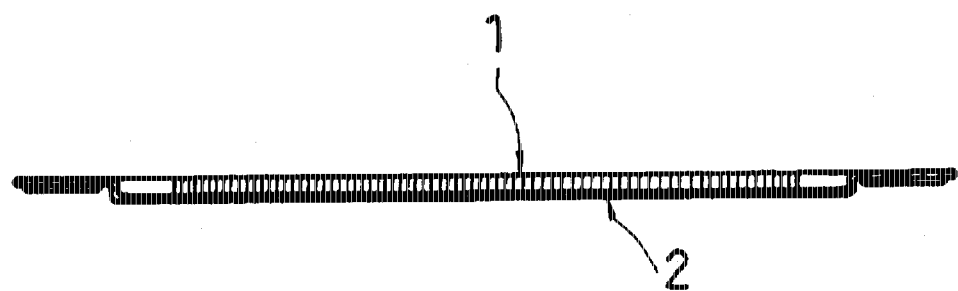
FIG. 2 is a sectional view taken along line 2—A of FIG. 1.
Figure 3:
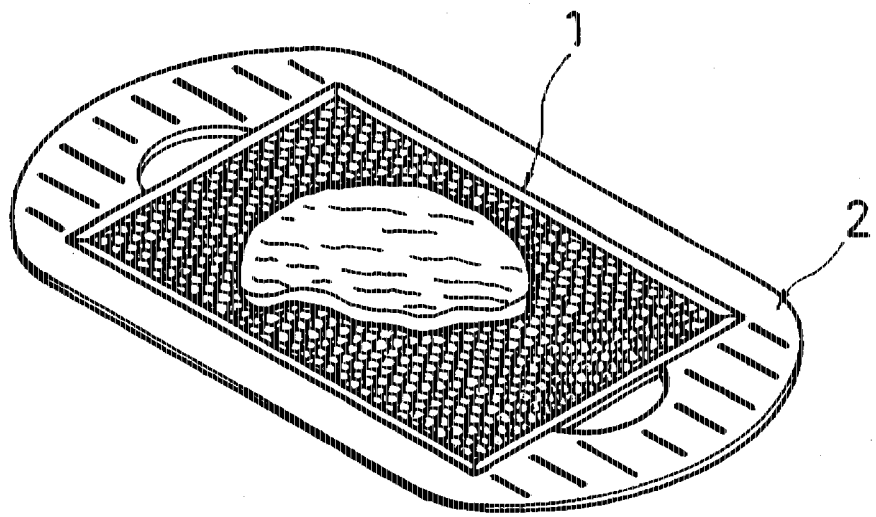
FIG. 3 is an elevational view of the present invention in use.
Figure 4:
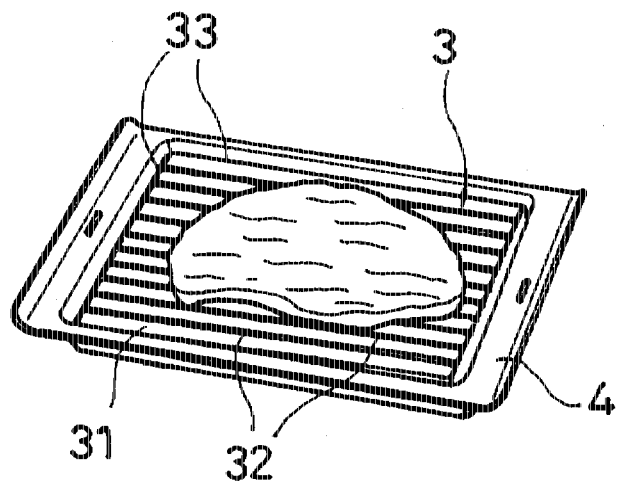
FIG. 4 is an elevational view of a conventional defrosting plate.

With reference to FIGS. 1–3, the present invention comprises a defrosting mesh plate 1 and a tray 2. The defrosting mesh plate 1 is made from aluminum laminae 11 of good heat conductivity. The laminae 11 are arranged, integrally formed and processed to constitute the defrosting mesh plate 1 such that the latter has a plurality of polygonal meshes 12, appearing like a honey-comb. A border 13 is further provided on four sides of the mesh plate 1. The meshes 12 run vertically to allow air or water flow therethrough. In use, the mesh plate 1 is fitted into the tray 2. The tray 2 is an iron one provided with a receiving space at the center, with the four sides suitably slanting upwardly to support the mesh plate 1.

In use, the food to be defrosting is placed on the mesh plate 1. Due to the exceptionally good heat conductivity of aluminum laminae 11, the food may speedily exchange heat therewith. At the same time, since the mesh plate 1 is provided with numerous vertical meshes 12, which can effectively enlarge the contact surface area between the laminae 11 and the air, heat exchange between the laminae 11 and the air may be considerably sped up, which cooperates with the heat exchange process between the laminae 11 and the food to achieve quick defrosting. The meshes 12 not only enlarge heat exchange area but also promote air circulation to allow surrounding hot air moving towards the food from all directions, eliminating any dead spots. In addition, the meshes 12 allow water drops generated during defrosting into the tray 2 below.

In summary, the defrosting mesh plate according to the present invention may effectively increase heat exchange area so that hot air may reach the food to be defrosted within the shortest possible time and may promote air circulation and allow water drip into the tray below. Furthermore, the improved defrosting plate of the invention is inexpensive and easy to manufacture.

Although the present invention has been illustrated and described with reference to the preferred embodiment thereof, it should be understood that it is in no way limited to the details of such embodiment but is capable of numerous modifications within the scope of the appended claims.

What is claimed is:

1. A defrosting plate assembly comprising:
   (1) a tray member formed of a composition containing iron, said tray member having formed therein a recessed portion having a substantially planar bottom surface; and,
   (2) a defrosting plate releasably received within said recessed portion of said tray member, said defrosting plate including:
      (a) an integrally formed mesh plate member, said mesh plate member having formed therein a substantially planar array of polygonal cavities, said mesh plate member being formed of a composition containing aluminum; and,
      (b) a boundary frame member fixedly coupled to and peripherally bounding said mesh plate member, said boundary frame member having a rim portion transversely overlapping at least a portion of said mesh plate member, said rim portion having a predetermined thickness dimension for maintaining said mesh plate member in spaced relation to said bottom surface of said tray member, whereby substantially all said mesh plate polygonal cavities are maintained in open communication one to the other.

* * * * *